July 5, 1949.  E. J. NICHOLSON  2,475,108
DEVICE FOR DETERMINING COLOR TEMPERATURES
OF LIGHT SOURCES
Filed Aug. 21, 1945

ELWOOD J. NICHOLSON,
INVENTOR

BY

ATTORNEY

Patented July 5, 1949

2,475,108

UNITED STATES PATENT OFFICE 2,475,108

DEVICE FOR DETERMINING COLOR TEMPERATURES OF LIGHT SOURCES

Elwood J. Nicholson, Los Angeles, Calif., assignor to Photo Research Corporation, San Fernando, Calif., a corporation of California Application August 21, 1945, Serial No. 611,878

3 Claims. (Cl. 88—22.5)

This invention pertains to a method for rapidly and accurately determining the color temperature of light. It is also directed to a simple, easily employed, apparatus whereby color temperature of a light source may be obtained directly and without the use of computers or the necessity of visually comparing colors.

Light from different sources may be of the same total intensity or brightness and still differ greatly in color or in the composition of the light in terms of wave length. Light from incandescent filament lamps contains a high proportion of wave lengths from the orange and red bands of the spectrum; sky light varies in accordance with the position of the sun and time of day; fluorescent lamps emit light which is low in red and high in blue.

Color temperature is an indication of the spectral composition of a light and is measured in degrees Kelvin. It is equivalent to the absolute temperature to which a black body would have to be heated to give a color matching the light emitted by a source in question.

Average noon sunlight is generally considered to be 5400° K. or 5500° K.; clear blue north sky may have a color temperature of 12000° K. to 18000° K.; tungsten lamps may emit light having a color temperature of 2360° K. to 2800° K. depending upon their age, wattage and whether the lamps are gas filled or not.

Determination of color temperatures is of great importance in color photography since all color films are designed to produce color images in true color balance only when the subject is photographed with light of a pre-determined color temperature. "Kodachrome" (manufactured by Eastman Kodak Co.) may give true color rendition under noon sun illumination but at 3:30 P. M. the images may show an over-all orange red tint due to the low color temperature of the afternoon light.

The method of this invention permits a photographer to rapidly, easily and mechanically obtain the color temperature of light being used upon his subject so that he may either select a color film best suited for true color rendition of subjects illuminated with such light or knowing the characteristics of his available film the photographer may then compensate for the deficiencies of the existing light by the use of compensating filters in his camera.

Some prior methods of determining color temperatures depended upon the matching of colors visually. Such methods are unsatisfactory because the eyes of most people differ in color perception and an individual's eye may differ from hour to hour in color perception. Eye fatigue and lack of physiological compensation introduce errors.

Other prior methods were complex in that they involved the use of numerous meters and two or more light filters and also required the use of special computers, tables etc. Such methods were not accurate, cumbersome and subject to many factors which rendered the results unsatisfactory.

The method of the present invention permits a photographer to obtain a positive direct reading of color temperature by the use of a single meter and without the necessity of employing computers. Generally stated, the method comprises admitting light being tested to a photoelectric cell in quantity only sufficient to produce a pre-determined meter response and then modifying the light by absorbing substantially all wave lengths of light except from a narrow band at one end of the visual spectrum. The color temperature is then read directly from the meter as shown by the modified response of the photoelectric cell. The scale of the meter is graduated in degrees Kelvin and includes a pre-determined reference point. The pole pieces of the meter are curved to produce a non-radial field so that the meter and its needle is responsive to small variations within a narrow range of low light levels and is not materially responsive to higher light levels.

An object of the present invention therefore is to disclose and provide a simple, substantially fool-proof, accurate method for determining the color temperature of light.

A further object is to disclose and provide an apparatus whereby color temperature may be directly obtained.

These and other objects will become apparent from the description given hereinafter, reference being had for purposes of illustration to the appended drawings in which.

Figure 1:
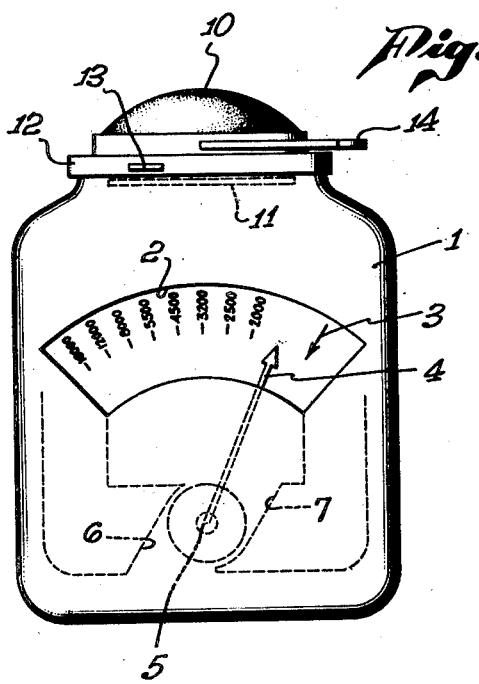
Fig. 1 is a front view of the color temperature meter.

An explanation of the method will be facilitated by first referring to a device arranged for use in carrying out the method. The form of device illustrated in the drawings comprises a housing 1 provided with a window 2 through which there is made visible a scale bearing a reference point 3 and graduations in degrees Kelvin. In the illustrated device it will be noted that the degrees Kelvin run from 2000–16000 and occupy substantially the entire area of the scale. A needle or movable index member 4 is movable in operative relation to the scale. This needle is part of a moving coil system generally indicated at 5 pivoted between the poles 6 and 7 of the meter contained within the housing. Attention is called to the fact that the faces of the poles are curved in an irregular manner so as to produce a non-radial field.

The upper end of the device is provided with a light-transmitting member which may assume a variety of forms. In the example given, a curved convex translucent light-transmitting member is indicated at 10. In position to receive light transmitted through the member 10 is a light-sensitive or light-receptive cell 11, such cell being connected to the meter. An adjustable iris diaphragm is carried by the device in close proximity to the cell and between the cell and transmitting member 10. Such iris diaphragm is generally indicated at 12 and may be operated either by means of a small lever 13 or by means of a rotatable sleeve or ring mounted upon the neck of the device. Iris diaphrams are well known and any suitable construction or form thereof may be used.

Figure 2:
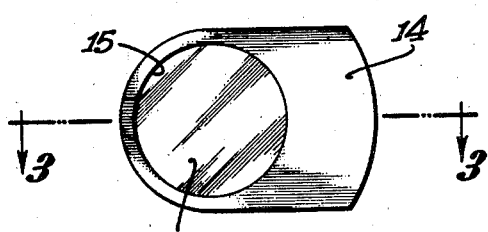
Figs. 2 and 3 are a plan view and transverse section respectively of a light filter for use in the meter.
Figure 3:
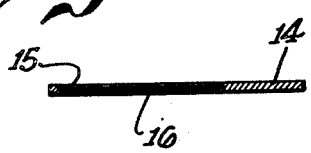

Means are also provided for selectively inserting a light filter at a point between the transmitting member 10 and the cell 11. In the example the neck of the device is shown provided with a slot adapted to receive a removable slide 14 carrying the light filter. As best shown in Figs. 2 and 3, the slide 14 is provided with an aperture 15, said aperture carrying thereacross a light filter 16.

The light filter preferably employed has a high absorption for all wave lengths of light up to about 600 millimicrons. A preferred filter which has been used with great success absorbs substantially all light up to 600 mu, transmitted small percentages from 610 to 620 mu and transmitted a major proportion of wave lengths between 630 and 700 mu, (between 80% and 90% transmission was attained on wave lengths of 650 to 700 mu inclusive). It should be noted that reference point 3 is placed at the extremity of the scale beyond indicia marked 2000 K. This position of the reference point is selected to provide a point on the scale indicative of the maximum response of the selected light-responsive cell 11 to all wave lengths of light admitted thereto. In other words, the alignment of the index needle 4 with the reference point provides a measure on the scale of the total energy of all wave lengths of light admitted to the cell to which the cell is capable of responding.

In carrying out the method of this invention the illumination which is being used on the subject is first tested for color temperature in the following manner: the device described hereinabove is exposed to the light being tested without the use of any filters whatsoever and the iris diaphragm is manipulated until the needle 4 of the instrument overlies the reference point 3. The light filter 16 (previously described) is then inserted into the instrument so as to modify this light and it will be found that the needle 4 will move away from the reference point back towards its original resting place or zero position and come to rest above or adjacent one of the graduations on the scale. The modified response of the cell to the limited wave length bands admitted by the filtered light is a measure of the energy of light emanated from that specific portion of the spectrum. Thus, the movement of the needle 4 in response to the filtered light is representative of the ratio between the modified response of the cell to the filtered light and the maximum response of the cell to all wave lengths of light admitted and this ratio is a measure of the color temperature of light. Since the scale is graduated in degrees Kelvin the color temperature may be read directly from the scale. No other manipulations or computation is necessary.

Advantages and uses of this method of determining color temperature will be apparent from the consideration of the following examples:

If, for instance, the meter has shown that the color temperature of the light is 3200° K. the photographer knows that the proper film to use is a film sensitized to give color balance for light of 3200° K. Such a film is commercially available and can be used for photographing the scene or subject without the use of compensating filters.

If, however, such film is not available and the photographer desires to use Kodachrome (which is balanced for light of 5500° K.) then during actual photographing he must use a compensating filter which will raise the color temperature of the light from 3200° K. to 5500° K. The required filter would transmit a sufficient amount of blue or short wave lengths and absorb a proportion of red or long wave length so as to produce total transmitted light of 5500° K.

In the event the color temperature of the light being used in photography was determined to be 12000° K. (in accordance with the method of my invention) and the picture was to be taken with an emulsion or film balanced for 5500° K. then an orange compensating filter would be used during photography, such filter being capable of absorbing the cold or blue wave lengths and transmitting sufficient warm or long wave lengths to transmit a total transmitted light of 5500° K.

Having therefore determined the color temperature of the light and having selected the compensating filter to be used during photography, it is now only necessary to determine the exposure to be given the film. The exposure to be given may be best determined by the use of any standard suitable photo-electric or other exposure meter in the normal manner. The exposure so determined is of course modified or multiplied by the filter factor of the compensating filter used in the camera.

The meter used in the device shown in Fig. 1 may be a microammeter of the type ordinarily used in photoelectric exposure meters, modified, however, so as to give a sensitive response over a short limited range of relatively low level light. Whereas the needle of an ordinary exposure meter moves over a scale for light levels differing through wide limits (as from 32 to 2000) or f-stops from 1.4 to 32, the needle of the meter of my device should be movable over the entire scale for a light intensity variation equivalent to only 2 or 3 f-stops, the remaining range being condensed or crowded into the area adjacent the reference point 3. Such response characteristics are imparted to the meter by suitably curving the pole faces 6 and 7.

Instead of employing a filter having a high absorption up to about 600 millimicrons the method may be carried out by employing a light filter which has a high absorption to all wave lengths above 400 or 480 but such filters are more difficult to obtain and the relative positions of the reference point and graduations in degrees Kelvin must be changed.

In a modified form of the device the iris diaphragm 12 may be in the form of a movable ring marked with a reference point and the neck of the device may carry graduations indicating light level f-stops or exposures. When the iris is adjusted so as to bring the needle 4 into alignment with the reference point 3 the position of the iris with respect to the graduations or indicia on the neck of the device will indicate exposures. In this manner the same device may be used both as an exposure meter and a color temperature meter. It is to be understood that the position of the iris is not changed when the light filter 16 is introduced into the device for the purpose of obtaining a direct reading of the color temperature.

Instead of employing an iris the light-transmitting member 10 may also be provided with a directional mat or hood so that when individual light sources are being tested for color temperature the photographer may direct the meter toward such light source and by moving the meter toward or away from such light source cause the needle 4 to overlie the reference point 3. After such coincidence is attained the light filter is slipped into position and the color temperature of the light source read directly from the meter. It will be evident that the device therefore permits individual light sources to be rapidly tested.

These and other changes and modifications will readily occur to those skilled in the photographic arts. All changes coming within the scope of the present claims are embraced thereby.

I claim:

1. A direct reading color temperature meter consisting of: a housing provided with an aperture; an outwardly extending convex light-gathering and light-transmitting member in the aperture; a light-responsive cell within the housing arranged to receive light transmitted by the member; an adjustable iris diaphragm in close proximity to the cell and between the cell and member; a meter within the housing operably connected to the cell and an index movable by the meter; a scale provided with indicia in degrees Kelvin and a reference point at one extremity of the scale and inoperative relation to the movable index for measuring maximum response of the cell to all wave lengths of light admitted; a window in the housing for observing said scale and index whereby said index may be observed at the reference point when light is modulated by the iris diaphragm; and a light filter selectively positionable between the cell and light-transmitting member, said light filter being adapted to selectively transmit only wave lengths longer than about 500 millimicrons whereby the relation of the modified response of the cell to the filtered light as indicated by movement of the index to the maximum response of the cell to light admitted as indicated by the reference point directly indicates color temperature of light being examined.

2. A direct reading color temperature meter consisting of: a housing provided with an aperture; a light-transmitting member in the aperture; a light-responsive cell within the housing arranged to receive light transmitted by the member; an adjustable iris diaphragm in close proximity to the cell and between the cell and member; a meter within the housing operably connected to the cell and an index movable by the meter; a scale provided with indicia in degrees Kelvin and a reference point at one end of the scale in operative relation to the movable index for indicating maximum response of the cell to all wave lengths of light admitted through said diaphragm; a window in the housing for observing said scale and index; and a light filter selectively positionable between the cell and light-transmitting member, said light filter being adapted to selectively transmit only wave lengths longer than about 500 millimicrons for modifying the response of the cell whereby the index directly indicates the ratio of the responses in color temperature in degrees Kelvin on the scale.

3. A direct reading color temperature meter consisting of: a housing provided with a light aperture; a light responsive cell within the housing arranged to receive light transmitted through the aperture; an adjustable iris diaphragm in proximity to the cell and positioned to intercept the light passing through the aperture; a meter operably connected to the cell and an index movable by the meter; a visible scale provided with indicia in degrees Kelvin and a reference point at one end of the scale in operative relation to the movable index for indicating the response of the cell to all wave lengths admitted to the cell for a particular setting of the iris diaphragm; and a light filter selectively positionable in front of the cell to intercept the light passing through said aperture, said light filter being adapted to selectively transmit only wave lengths longer than about 500 millimicrons for modifying the response of the cell whereby the index directly indicates the ratio of the responses in color temperature in degrees Kelvin on the scale.

ELWOOD J. NICHOLSON.

REFERENCES CITED

The following references are of record in the file of this patent:

UNITED STATES PATENTS

| Number | Name | Date |
| --- | --- | --- |
| 1,931,283 | Brewer | Oct. 17, 1933 |
| 1,990,361 | Bailey | Feb. 5, 1935 |
| 2,016,469 | Weston | Oct. 8, 1935 |
| 2,143,500 | Smethurst et al. | Jan. 10, 1939 |
| 2,214,283 | Norwood | Sept. 10, 1940 |
| 2,298,667 | Weymouth | Oct. 13, 1942 |
| 2,346,529 | Whittenton | Apr. 11, 1944 |

FOREIGN PATENTS

| Number | Country | Date |
| --- | --- | --- |
| 113,865 | Great Britain | 1918 |

OTHER REFERENCES

Journal of the Optical Society of America, vol. 26, June 1936, pages 260 and 261.

American Photography, for June 1944, pages 36 and 37.